Oct. 11, 1927.

S. C. ENZENAUER 1,645,095

TRAP

Filed Jan. 26, 1925

2 Sheets-Sheet 1

Inventor
Stephen C. Enzenauer
By C A Snow & Co
Attorneys

Oct. 11, 1927.   1,645,095
S. C. ENZENAUER
TRAP
Filed Jan. 26, 1925   2 Sheets-Sheet 2
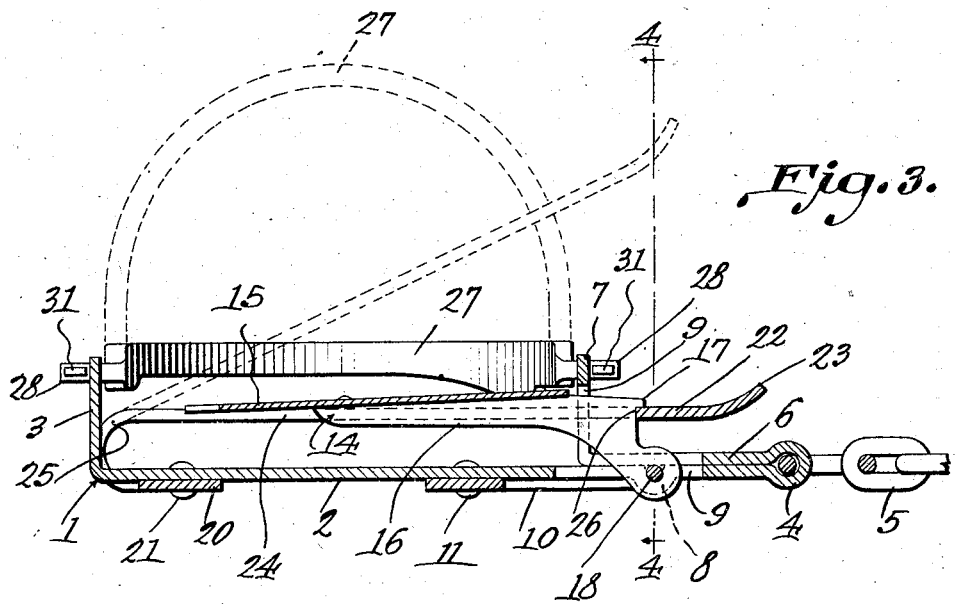
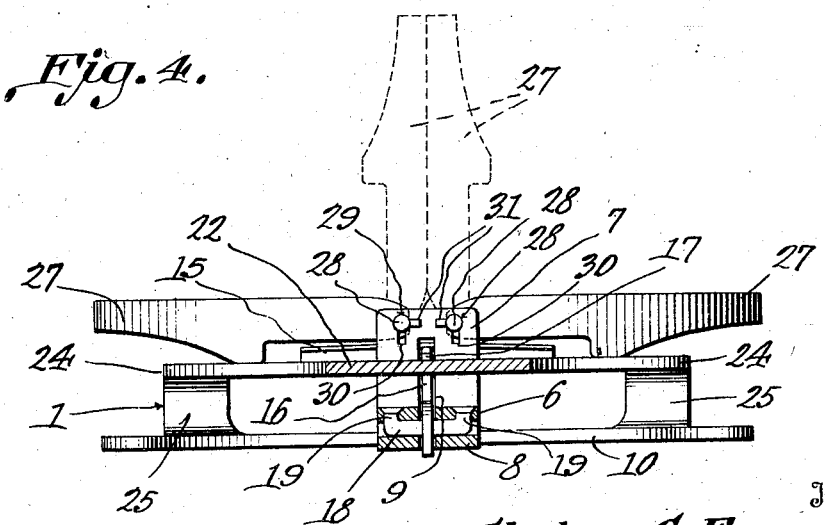
Inventor
Stephen C. Enzenauer Patented Oct. 11, 1927.

1,645,095

UNITED STATES PATENT OFFICE.

STEPHEN C. ENZENAUER, OF BANCROFT, IDAHO, ASSIGNOR OF ONE-THIRD TO JOHN F. BRADY, OF BANCROFT, IDAHO.

TRAP.

Application filed January 26, 1925. Serial No. 4,855.

The device forming the subject matter of this application is a jaw trap, and the invention aims to provide novel means whereby the trigger may be engaged directly with the spring, to hold the trap set, without resorting to an intermediate dog as a spring-retaining means. Another object of the invention is so to construct the trap that the spring may be latched in set position, the jaws being swung open after the spring has been latched, the result being that the chance that the fingers of the operator will be engaged by the jaws, will be reduced to the minimum.

It is within the province of the disclosure to improve generally and to enhance the utility of devices of that sort to which the invention appertains.

Although a preferred form of the invention has been shown, it will be understood that a mechanic, working within the scope of what is claimed, may make such alterations as his skill may suggest, without departing from the spirit of the invention.

In the accompanying drawings:—

Figure 1:
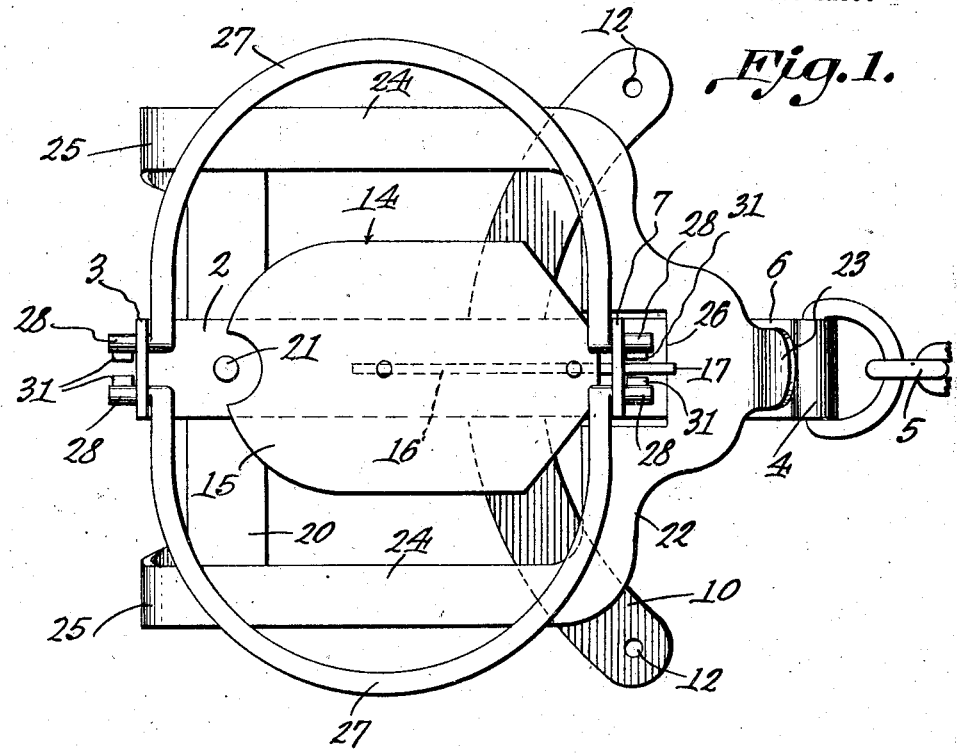
Figure 2:
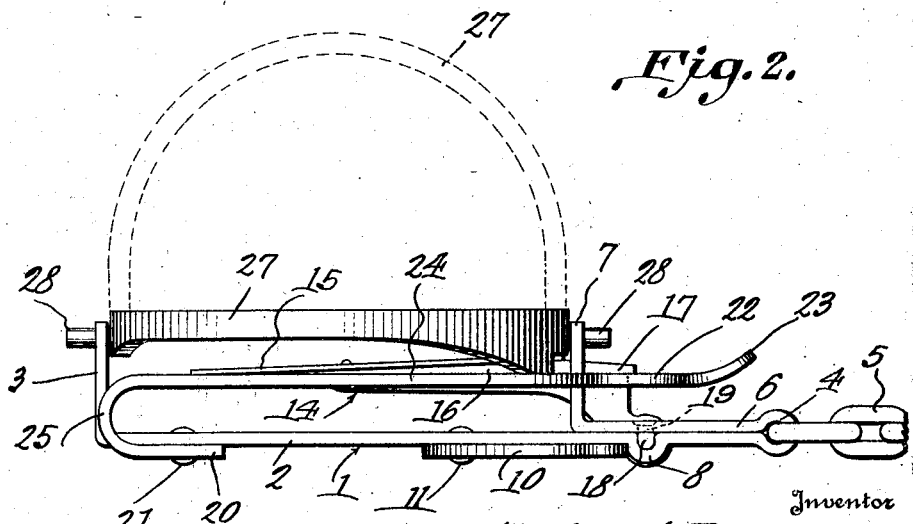

Figure 1 shows in top plan, a trap constructed in accordance with the invention, the jaws being set; Figure 2 is a side elevation; Figure 3 is a longitudinal section; and Figure 4 is a section on the line 4—4 of Figure 3.

In carrying out the invention, there is provided a frame 1, including a base strip 2, one end of which is formed into an upstanding bearing 3. The opposite end of the base strip 2 is curved into an eye 4 wherewith a chain 5 or other anchoring means may be assembled, the eye being prolonged to form an arm 6 located on top of the base strip 2 at one end thereof, the arm terminating in an upstanding bearing 7 complemental to the bearing 3. That portion of the base strip 2 which lies beneath the arm 6 is distorted to form a transverse seat 8. The arm 6 and the underlying portion of the base strip 2, as well as the bearing 7, are supplied with a slot 9 which extends across the seat 8. A curved cross piece 10 is attached intermediate its ends by a securing element 11 to the base strip 2, the member 10 being disposed transversely of the base strip, as Figure 1 will disclose clearly. There are openings 12 in the ends of the cross piece 10, whereby the trap may be spiked down to a log, or secured otherwise to any accessible object.

The trap comprises a trigger 14 including a tread plate 15 and an arm 16 secured to the under surface of the tread plate, the arm terminating at its rear end in a detent 17. The arm extends through the slot 9. A securing member 18, which may be a U-shaped rivet, is located in the seat 8, the upstanding arms 19 of the rivet being beaten down on the element 6, the rivet 18 forming a pivotal mounting for the part 16 of the trigger 14, as shown in Figure 2.

The spring of the trap comprises a main member 20 disposed crosswise of the base strip 2 and connected thereto by a securing element 21. The spring embodies a head 22 having an upwardly inclined finger piece 23, the head being connected to the main member 20 by side strips 24 joined to the main member 20 by curved portions 25. In the inner edge of the head 22 there is a notch or opening 26. For the sake of brevity in claiming the invention, the spring may properly be described as a loop-shaped member connected (at 21) to the frame 1.

Arcuate jaws 27 are supplied, the jaws having outstanding trunnions 28 mounted to rock in openings 29 in the bearings 3 and 7, the bearings having restricted slots 30 communicating with the openings, the trunnions 28 being equipped with outstanding fins 31 cooperating with the outer surfaces of the bearings 7 and 3.

In practical operation, the spring is pressed down into approximate parallelism with the base strip 2, by way of the finger piece 23, the bearing 7 projecting upwardly through the opening 26. The trigger 14 is raised at its free end until the detent 17 engages the head 22 of the spring at the base of the notch or openings 26 in the spring. The jaws 27 then are swung into an open position, to overhang the spring, as shown in Figure 1. The trap now is set, and it is to be observed that the spring may be compressed and be held by the trigger 14, before the jaws are opened from the dotted line position of Figure 4 to the solid line position of that figure. The result is that the operator does not have to grab the jaws 27 and pull them apart, to set the trap, the danger of injuring the operator being reduced accordingly. When an animal treads on the trigger 14, the trigger swings downwardly on its pivotal mounting 18, the detent 17 is disengaged from the head 22 of the spring, and as the head of the spring moves upwardly, the spring cooperates with the jaws 27, along the edges of the opening 26, to close the jaws and to hold them closed.

Summarizing the advantages, features of operation and points of construction, it is to be observed that since the detent 17 of the trigger 14 engages directly with the head 22 of the spring, the trap dispenses with the dog which usually is interposed between the trigger and the spring in a jaw trap. It is to be observed that the fins 31 of the jaws 27 are out of alinement with the slots 30 in the bearings 3 and 7 at all times saving when the jaws are closed together as shown in dotted line in Figure 4. Although the trunnions 28 may be mounted in the bearings 3 and 7, during the manufacture of the trap, by inserting the fins 31 through the slots 30, the slots and the fins do not register when the jaws are separated enough to grip the leg of an animal. The fins 31, therefore, reinforce the mounting of the jaws on the frame of the trap and prevent an unusually strong or large animal from yanking the trunnions 28 of the jaws out of the openings 29 wherein the trunnions are mounted.

The device to which this application relates, is intended to provide a trap wherein there is no dog to throw the animal's foot out of the trap when the trap is sprung. This feature should be thoroughly understood. If, by way of experiment, the thumb of an operator is placed partly on the pan and partly on the dog of an old-style trap, the dog will throw the thumb out of the trap when the trap is sprung. The same thing happens when an animal treads on both dog and pan. A grown muskrat's front foot is about one inch long and its hind foot is about three inches long. A muskrat is seldom caught by its hind foot because it steps on both dog and pan with its hind foot perhaps in 80 out of 100 instances.

It is one purpose of this specification to make plain and manifest the fact that the cross piece 10 extends beyond both sides of the trap. This is done in order to make the trap stand firmly and flat-footed. In the old-style article of the class described, the cross piece extends only half-way across the trap, leaving the loose jaw half an inch above ground, with no under support to prop it. When an animal steps on the loose jaw, the old-style trap tips, and the consequent jolting causes the pan to drop, putting the trap out of commission until it is re-set.

What is claimed is:—

1. A trap comprising a frame including bearings having openings and provided with reduced slots communicating with the openings, jaws having trunnions mounted to rock in the openings, the trunnions being supplied with outstanding fins insertible through the slots, the slots and the fins being so located with respect to each other that the fins move out of alinement with the slots as soon as the jaws are started from a closed position to an open position, spring means for closing the jaws, and trigger mechanism for holding the trap set.

2. A trap comprising a frame, arcuate jaws pivoted to the frame, a spring including a main member disposed transversely of the frame and secured intermediate its ends to the frame, a head located approximately parallel to the main member, arms connected to the ends of the head, and downwardly curved portions joining the ends of the arms to the ends of the main member, the head of the spring cooperating with the jaws to close the jaws, a trigger pivotally mounted on the frame and comprising a part extended outwardly beyond the jaws and engaged directly with the head of the spring at a point external to the jaws to restrain the spring, when the trap is set, and a cross piece secured intermediate its ends to the frame in spaced relation to the main member of the spring and at a point adjacent to the place of engagement between said part of the trigger and the head of the spring, the cross piece and the main member of the spring forming a supporting base for the trap, said curved portions serving to hold the head and the arms of the spring in parallel relation to the plane defined by the cross piece and the main member of the spring, when the trigger is engaged with the head of the spring.

In testimony that I claim the foregoing as my own, I have hereto affixed my signature.

STEPHEN C. ENZENAUER.